Oct. 3, 1950     C. G. JACKSON     2,524,316
NEWSPAPER BINDING MACHINE
Filed Feb. 7, 1948     5 Sheets-Sheet 4

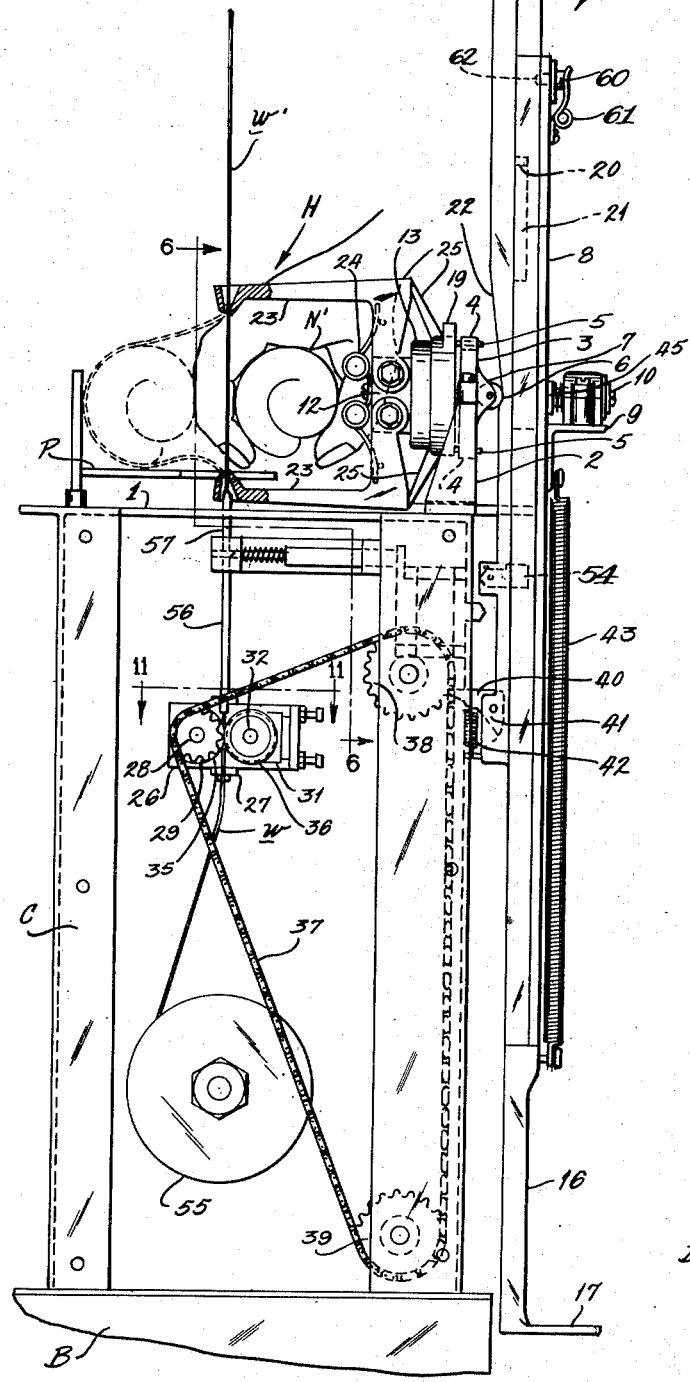
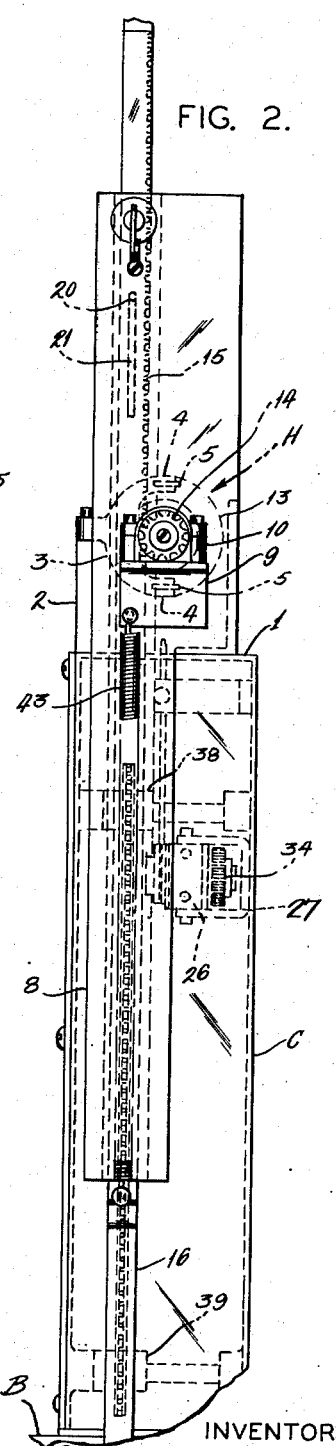
FIG. 1.
FIG. 2.
INVENTOR:
CHARLES G. JACKSON
BY Harry A. Benner
ATTORNEY.

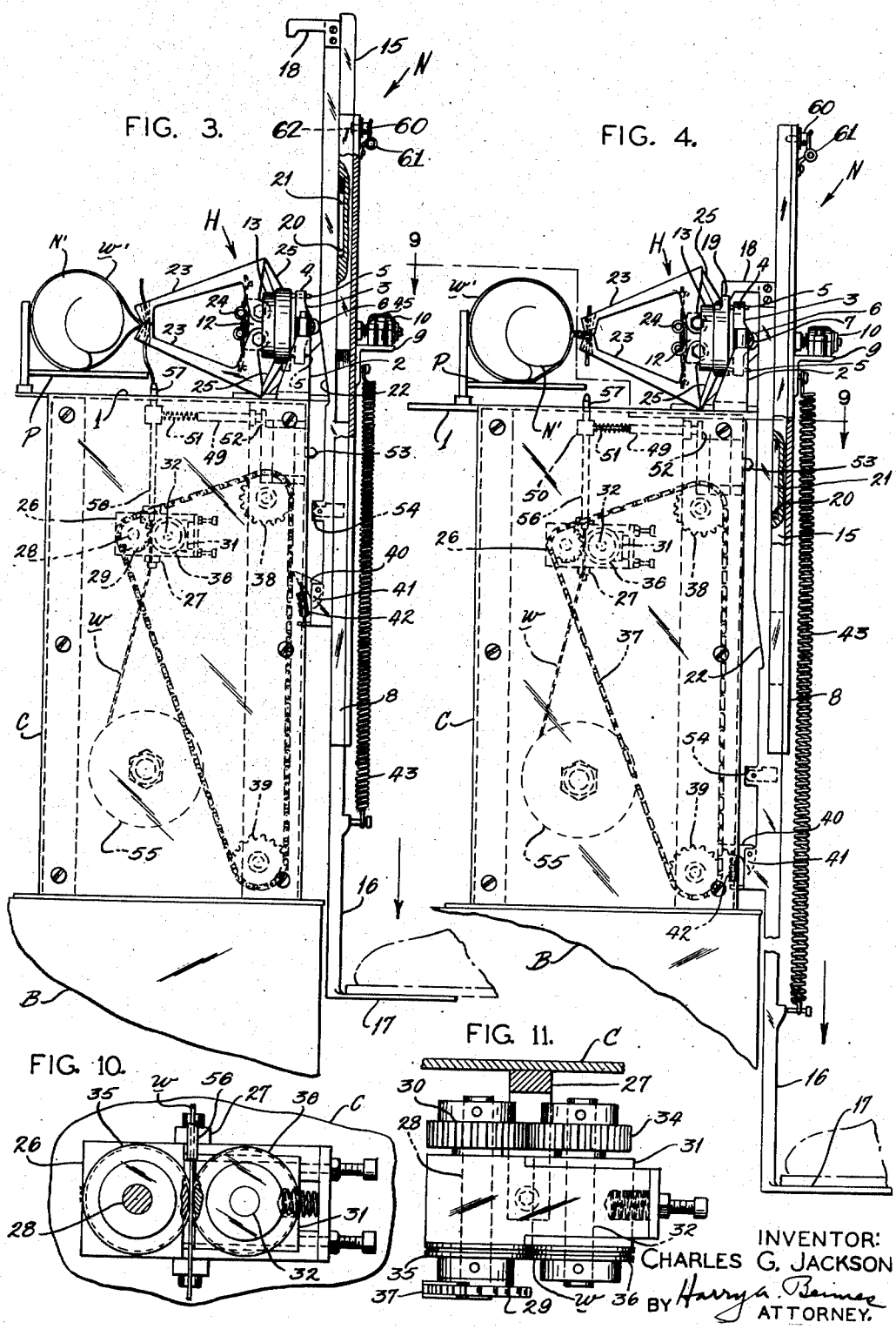

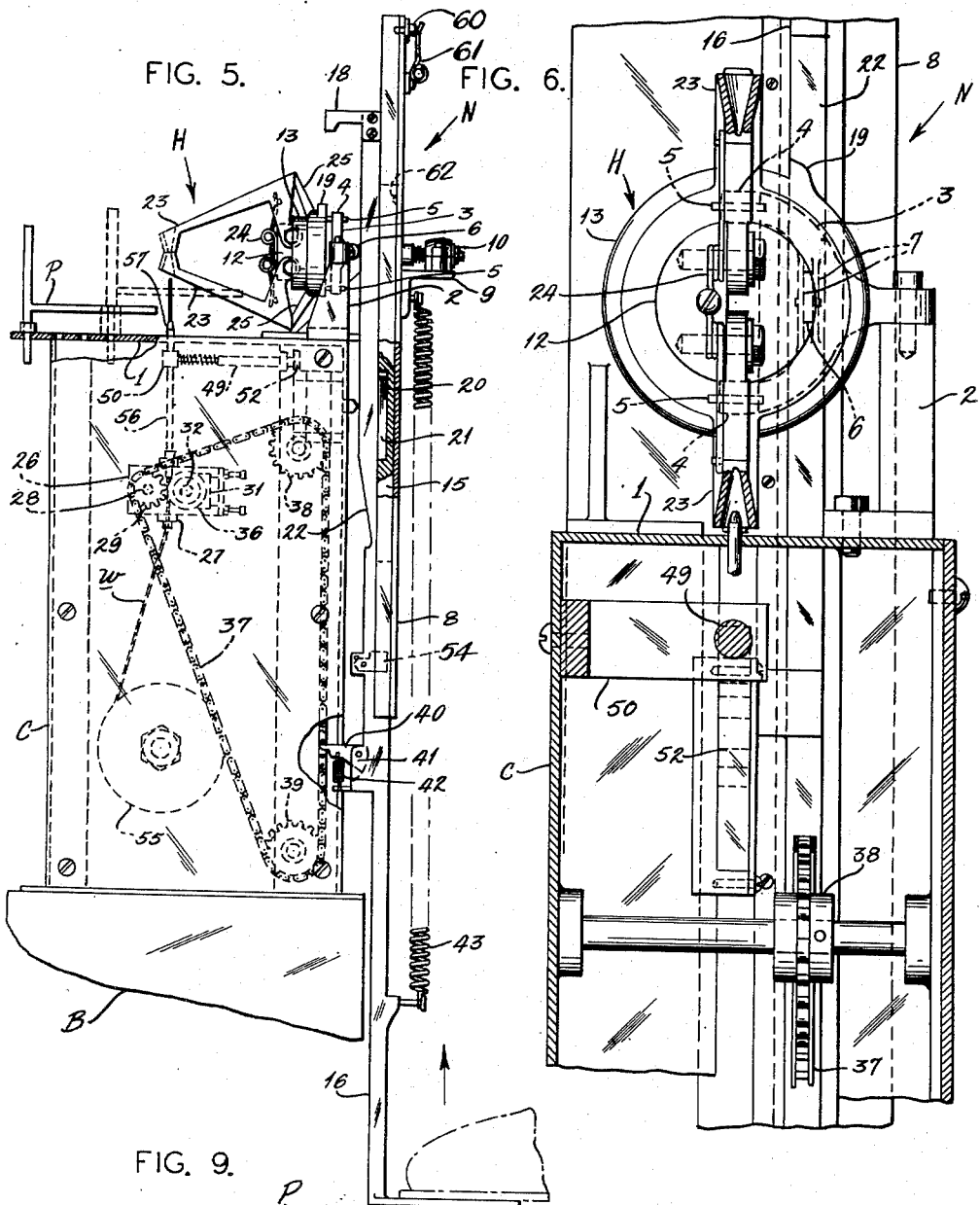
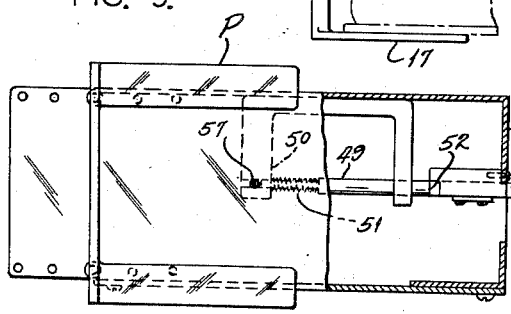

INVENTOR:
CHARLES G. JACKSON
ATTORNEY.

Oct. 3, 1950 — C. G. JACKSON — 2,524,316
NEWSPAPER BINDING MACHINE
Filed Feb. 7, 1948 — 5 Sheets-Sheet 5
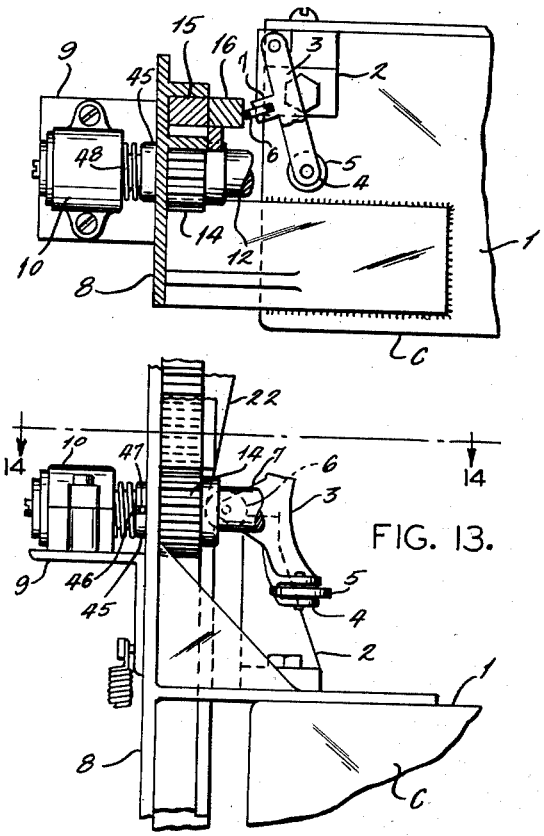
FIG. 14.
FIG. 13.
FIG. 15.
FIG. 18.
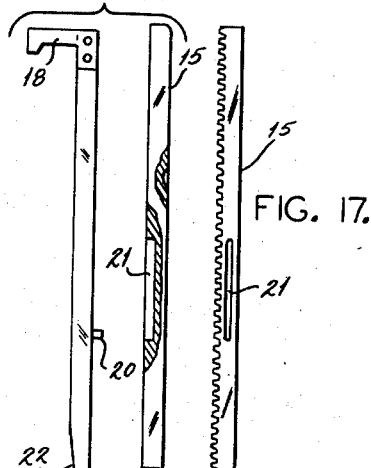
FIG. 16.
FIG. 17.
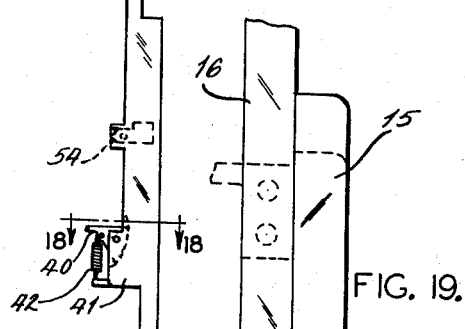
FIG. 19.
INVENTOR:
CHARLES G. JACKSON
BY Harry A. Reimer
ATTORNEY.

Patented Oct. 3, 1950

2,524,316

UNITED STATES PATENT OFFICE 2,524,316

NEWSPAPER BINDING MACHINE

Charles G. Jackson, St. Louis, Mo.

Application February 7, 1948, Serial No. 7,000

4 Claims. (Cl. 100—31)

My invention has relation to improvements in newspaper binders and it consists in the novel features of construction more fully set forth in the specification and pointed out in the claims.

The invention is directed primarily to a device for wrapping binding wire around newspapers that have been rolled to facilitate delivery thereof, and which includes mechanism for periodical feeding the wire, twisting the ends thereof to firmly engage the newspaper and thereafter cutting the wire to prepare the machine for the subsequent wrapping operation.

The principal object of the invention is to provide a machine for binding newspapers mechanically instead of manually, as heretofore performed, thereby saving considerable time and at the same time eliminating the onerous burden of hand-binding heretofore performed by newspaper carriers.

A further object of the invention is to provide a suitable adjustment whereby newspapers of varying sizes may be handled by the binding machine. These objects, together with other advantages inherent in the machine, will be more apparent from a detailed description thereof in connection with the accompanying drawings, in which—

Figure 7:
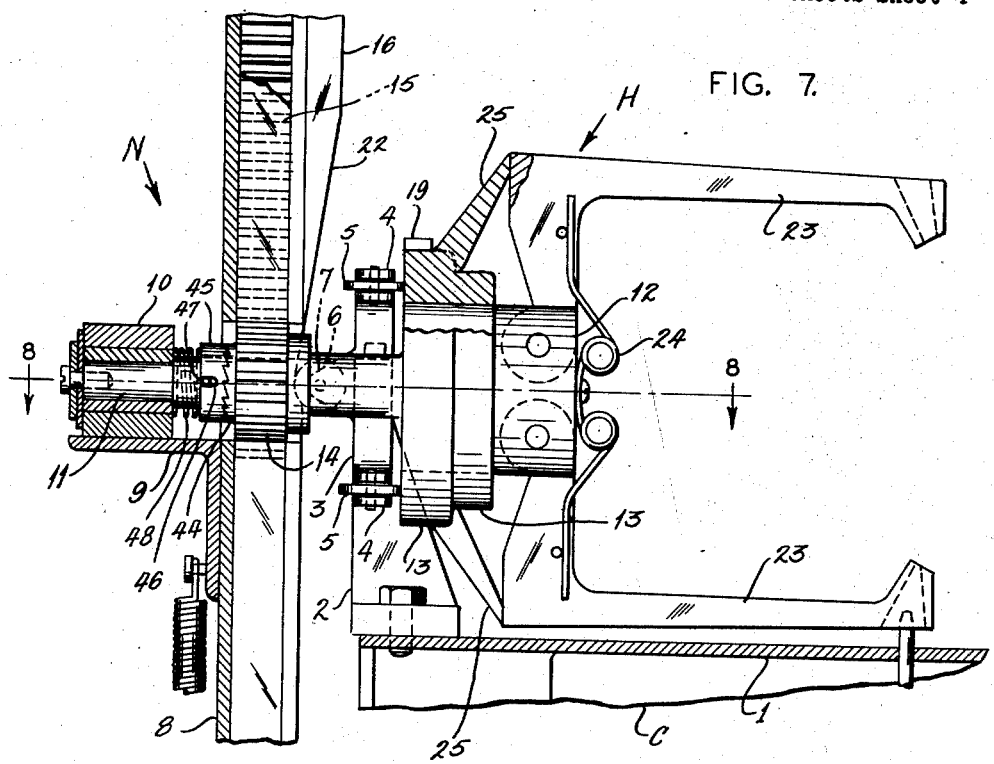
Figure 8:
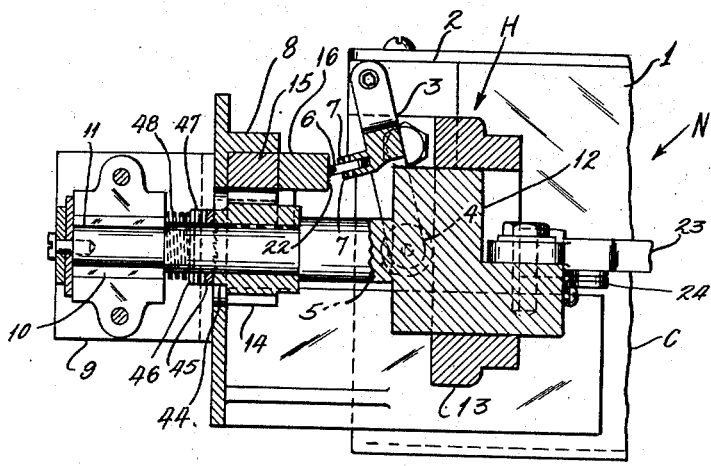
Figure 12:
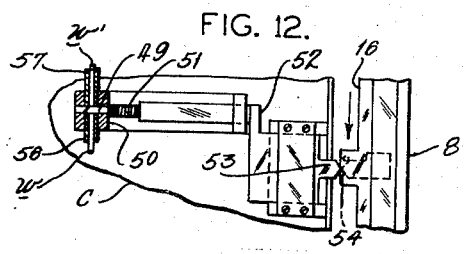

Figure 1 is a side elevation with parts broken away of my binding machine with a wrapped newspaper being inserted therein as the first step in the operation thereof; Fig. 2 is a front elevation of the machine with parts broken away; Fig. 3 is a side elevation with parts broken away similar to Fig. 1 showing the second step in the operation, namely the articulation of the jaws of the rotating head for twisting the wire; Fig. 4 is a side elevation showing the third step in the operation, namely the twisting of the wire by the revolving head after the wire has been cut to proper length; Fig. 5 is a side elevation with parts broken away of the machine showing the fourth step in the operation, namely the feeding of the wire through the perforated bosses terminating the jaws of the rotating head; Fig. 6 is a vertical sectional detail with parts broken away taken on the line 6—6 of Fig. 1; Fig. 7 is an enlarged side elevation with parts broken away of the revolving head, together with the mechanism for articulating the jaws and effecting the rotation thereof; Fig. 8 is a sectional detail taken on the line 8—8 of Fig. 7; Fig. 9 is a horizontal sectional detail taken on the line 9—9 of Fig. 4; Fig. 10 is a detail of the feed rollers for the wire; Fig. 11 is a horizontal sectional detail taken on the line 11—11 of Fig. 1; Fig. 12 is a detail of the wire cutter, together with the reciprocating mechanism therefor; Figure 13 is a side elevation of the actuating bar and yoke structure whereby the wire holding jaws are manipulated; Figure 14 is a cross-sectional detail taken on the line 14—14 of Figure 13; Figure 15 is a combined side elevation and vertical section of the wire cutting mechanism; Figure 16 is a combined side elevation of the actuating bar and rack bar in juxtaposition, the rack bar having parts broken away; Figure 17 is a side elevation of the rack bar shown in Figure 16; Figure 18 is a cross-sectional detail taken on the line 18—18 of Figure 16 and Figure 19 is a side elevational view showing the detent that serves to arrest the movement of the rack bar 15 at the end of a stroke.

Referring to the drawings—B represents the bed of a truck on which my newspaper binding device N is mounted. The binding device comprises a supporting case C on the top plate 1 of which is mounted a standard 2 having a yoke 3 pivotally mounted thereon, which yoke has integral arms 4, 4 carrying rollers 5, 5 at their free ends and an intermediate roller 6 mounted between ears 7, 7.

The supporting case C carries a guide channel 8 on the outer face of which is an angle bracket 9 for supporting a bearing 10 in which a spindle 11 is mounted.

On the inner end of the spindle 11 there is a cylindrical head 12 on which a collar 13 is adapted to slide, and at an intermediate point on the spindle a gear wheel 14 is loosely mounted for engagement with a rack bar 15 slidingly mounted in the guide channel 8. The rack bar 15 is coupled to an actuating bar 16, which has a pedal 17 at its lower end and a stop lug 18 at its upper end, the latter being adapted for engagement with a lug 19 projecting from the collar 13 so that lug 18 may serve as a stop after the rotating head H has been actuated, as will presently appear.

The actuating bar 16 has a pin 20 near its upper end which projects into a slot 21 in the rack bar 15 so that it may be moved downwardly a short distance before picking up the rack bar. In this initial movement a cam surface 22 on the actuating bar rides over roller 6 on yoke 3, whereby rollers 5, 5 engage collar 13 causing collar 13 to slide on head 12 and cause jaws 23, 23 of rotating head H to be brought together. The jaws 23, 23 are pivoted on head 12 and a spring 24 forces them apart when the pressure of fingers 25, 25 on collar 13 is released. The jaws 23, 23 are provided with suitable openings to receive binding wire w fed to them by the wire feeding mechanism within case C.

This wire feeding mechanism comprises a bearing block 26 mounted on a bracket 27 on case C which block carries a shaft 28 having a sprocket 29 at one end and a gear 30 at the other. A second bearing 31 is slidingly mounted on block 26 and also has a shaft 32 carrying a gear 34 in mesh with gear 30. Adjusting screws 63, 63 are provided to effect the proper adjustment between sheaves 35 and 36 whereby these sheaves may be caused to effectively grip the wire $w$. A sheave 35 and a sheave 36 are mounted on the respective shafts 28 and 32 and serve to feed the wire upwardly to the jaws 23, 23 on actuation of the sprocket 29 by a chain 37 which also passes over sprockets 38, 39 mounted in case C. A part of chain 37 is disposed adjacent and parallel to actuating bar 16, and a dog 40 is pivotally mounted between lugs 41, 41 projecting from the bar so as to ride over the chain on the downward stroke of the bar. At the end of said downward stroke a spring 42 pulls the dog into position to engage the chain to actuate the same on the upward stroke of the bar under influence of spring 43 (Figures 3 and 4).

After the pin 20 has come into engagement with the bottom of slot 21 the rack bar 15 will be picked up and will rotate gear wheel 14. By this time the jaws 23, 23 will have been moved together by the movement of collar 13, and gear wheel 14 will rotate clutch member 44 which engages clutch member 45 to cause the head H to rotate by virtue of the engagement of slot 46 in clutch member 45 with pin 47 on the shaft 11. Clutch member 45 is held in engagement with clutch member 44 by a spring 48 on the down stroke of the rack bar 16, but is allowed to slip over the same on the upstroke of the rack bar.

The wire $w$ is cut off at the beginning of the downstroke of the actuating bar 16 by the wire cutter which comprises a cutter 49 mounted in a block 50, said cutter having a shoulder between which and the block is a spring 51 for retracting the cutter.

The butt end of the cutter is engaged by a sliding member 52 which carries a cam nose 53 for engagement with a cam 54 carried by actuating bar 16. The cam 54 forces the cutter 49 through the wire $w$ as the bar 16 descends so that the short piece of wire thus cut from the spool 55 may be wrapped around the newspaper N' placed on the platform P. In order to support the wire $w$ above the feed rolls 35, 36, tubes 56 and 57 are fixed in the block 26 and block 50 as shown (Fig. 1).

From the foregoing it is apparent that in binding newspapers the operator places the rolled paper on platform P, which has previously been adjusted to the size of paper and, while holding the same in place with the wire $w$ looped around it, he steps on the pedal 17 to force the actuating bar 16 downwardly. The first operation of bar is to bring the jaws 23, 23 of rotating head H together, and then almost immediately the cutter 49 is actuated to cut off the short length of wire $w'$ that is to bind the newspaper N'. The continued downward movement of the bar picks up the rack bar 15 (as above described) and causes the same to rotate the head H. Obviously, the rotation of head H twists the wire $w'$ to securely bind the newspaper N'. At the end of the downstroke of the bar 16 the binding is completed. On releasing the pedal the bar 16 is pulled upwardly by spring 43 and the dog 40 engages sprocket chain 37 to feed the wire $w$ upwardly through jaws 23, 23, which then return to their starting position with the wire $w$ extending between them for the next binding operation.

At the upper end of guide channel 8 there is a detent 60 held by spring 61 in contact with the rack bar 15. This detent serves merely to stop the movement of the bar at the end of a cycle of operations by entering into a slight depression 62 formed in the bar 15.

Having described my invention, I claim:

1. A newspaper binding machine comprising a platform for a rolled paper, means for holding binding wire adjacent to said platform, said wire holding means including a rotating head having movable jaws, means for closing the jaws, means for cutting off a length of binding wire held by the jaws, means for rotating said head after a cutting off operation to perform a twisting operation of the wire holding means, a common actuating member for operating the aforesaid means, and means for feeding wire to the wire holding means after the twisting operation is completed.

2. A newspaper binding machine comprising means for holding binding wire, means for cutting said wire into suitable lengths as determined by engagement of a rolled newspaper with the wire to form a loop, a rotating head for twisting together the ends of the wire length looped around the newspaper, means for feeding the wire to the head, and actuating means for the cutting means, rotating head and wire feeding means.

3. A newspaper binding machine comprising means for holding binding wire, means for cutting said wire into suitable lengths as determined by engagement of a rolled newspaper with the wire to form a loop, a rotating head for twisting together the ends of the wire length looped around the newspaper, means for feeding the wire to the head, and a common actuating means for the cutting means, rotating head and wire feeding means.

4. A newspaper binding machine comprising means for holding binding wire, means for cutting said wire into suitable lengths as determined by engagement of a rolled newspaper with the wire to form a loop, a rotating head for twisting together the ends of the wire length looped around the newspaper, said head having jaws arranged for movement to and from each other, means for feeding the wire to said jaws, and actuating means for the cutting means, rotating head and wire feeding means.

CHARLES G. JACKSON.

REFERENCES CITED

The following references are of record in the file of this patent:

UNITED STATES PATENTS

| Number | Name | Date |
| --- | --- | --- |
| 1,141,730 | Thacker | June 1, 1915 |
| 1,360,236 | McChesney | Nov. 23, 1920 |
| 1,429,160 | Nelson | Sept. 12, 1922 |
| 1,555,843 | Hasen | Oct. 6, 1925 |
| 2,371,806 | Cooper | Mar. 20, 1945 |